UNITED STATES PATENT OFFICE.

EDWARD SAMUEL, OF PHILADELPHIA, PENNSYLVANIA.

MANUFACTURE OF IRON AND STEEL.

SPECIFICATION forming part of Letters Patent No. 250,006, dated November 22, 1881.

Application filed July 5, 1881. (No specimens.)

*To all whom it may concern:*

Be it known that I, EDWARD SAMUEL, a citizen of the United States, residing in Philadelphia, Pennsylvania, have invented certain Improvements in the Manufacture of Iron and Steel, of which the following is a specification.

The object of my invention is to utilize granulated, crushed, pulverized, or otherwise finely-divided ores of iron in the manufacture of iron or steel by mixing therewith fine particles of cast or wrought iron or steel, and causing the cohesion of the combined particles by oxidation, the mass being formed into blocks, slabs, or lumps adapted for reduction in a suitable furnace, and capable of withstanding the handling to which they must be subjected prior to reduction.

In carrying out my invention, I take finely-divided ores of iron and mix therewith particles of wrought iron or steel—such as filings, clippings, turnings, or millings—the mixture being then moistened with water, either pure or naturally or artificially saline, alkaline, or acidulated, or with some other fluid which will promote oxidation.

The mass, while in a mortar-like or pasty condition, may be formed into convenient blocks, slabs, or lumps, which become hard when dry, owing to cohesion induced by oxidation, and are thus adapted for handling and for reduction in a smelting-furnace.

The proportion of iron ore to the cast or wrought iron or steel will vary in accordance with the character of the product desired.

I am aware that it is old to unite fine particles of ore and metal turnings or filings together by means of a cementing material, and also that it has been proposed to unite fine particles of cast-iron by moistening the same with water and pressing the mass in a mold; but my invention differs from either of these in that I utilize the oxidation of the particles of iron or steel to unite the particles of ore thereto, thus dispensing with the cementing materials heretofore considered necessary in dealing with such a mixture.

I claim as my invention—

1. The within-described process of utilizing finely-divided ores of iron, the said process consisting in mixing the said ores with particles of wrought or cast iron or steel, and cementing the whole together by oxidation, as set forth.

2. As a new article of manufacture, a slab, block, or lump composed of finely-divided iron ore and particles of cast or wrought iron or steel cemented to the ore by oxidation, as set forth.

In testimony whereof I have signed my name to this specification in the presence of two subscribing witnesses.

EDWD. SAMUEL.

Witnesses:
 WILLIAM SELFRIDGE,
 HARRY SMITH.